United States Patent [19]

Virdee

[11] Patent Number: 4,581,492

[45] Date of Patent: Apr. 8, 1986

[54] DIGITAL DUPLEX COMMUNICATION SYSTEM

[75] Inventor: Nirmal S. Virdee, Reigate, England

[73] Assignee: U.S. Philips Corporation, New York, N.Y.

[21] Appl. No.: 504,547

[22] Filed: Jun. 15, 1983

[30] Foreign Application Priority Data

Jun. 25, 1982 [GB] United Kingdom ................ 8218478

[51] Int. Cl.⁴ .............................................. H04B 3/20
[52] U.S. Cl. .................................... 179/170.2; 370/32
[58] Field of Search ............... 179/170.2, 170.6, 170.8;
370/32; 364/721

[56] References Cited

U.S. PATENT DOCUMENTS 4,159,527  6/1979  Yahata et al. ........................ 364/721
4,484,322  11/1984  Fossati et al. ................. 179/170.2 X

FOREIGN PATENT DOCUMENTS 2007946  5/1979  United Kingdom .

Primary Examiner—James L. Dwyer
Attorney, Agent, or Firm—Jack E. Haken; James J. Cannon, Jr.

[57] ABSTRACT

A digital duplex communication system includes an echo canceller of the look-up table type. The echo canceller has a random access memory (RAM), a digital to analog converter (DAC), a subtractor, adaption means, and an address generator. The echo canceller stores echo replicas for combinations of data bits transmitted by the transmitter and subtracts these echo replicas from a received signal on line before application to the receiver. The capacity required for the RAM is reduced by storing only one echo replica for each of two complementary sets of data. To achieve this the address generator is split into a primary address generator and a complementary address generator so that complementary sets of data present the same address to the RAM. The primary address generator produces a signal to indicate which of the two complementary data sequences is being transmitted and appropriately sets the adaption means over line and a complementing circuit over line. The combination of the signal on line and the output of the subtractor on line causes the echo replica to be updated by the adaption means which may be an adder circuit. The complementing circuit operates on the output of the RAM via the latch circuit to determine the sign of the echo replica applied to the subtractor via the DAC.

6 Claims, 5 Drawing Figures

DIGITAL DUPLEX COMMUNICATION SYSTEM

BACKGROUND OF THE INVENTION

1. Field of the Invention

The invention relates to a digital duplex communication system comprising a transmitter/receiver including an echo canceller, the echo canceller comprising a memory unit having a plurality of locations for storing echo replicas, an address generator for causing echo replicas to be read out from selected locations of the memory unit depending on the transmitted data, a subtractor for subtracting the echo replica from the received signal, and adaption means for updating the stored echo replica.

2. Description of the Prior Art

Such a system is disclosed in U.K. Patent Application No. 2007946A. The memory unit in the echo canceller described in that application comprises a plurality of locations, the number of locations being equal to the number of possible combinations of transmitted data during the period over which the correction for each data bit is effective. It is suggested in the aforementioned patent application that the number of storage locations may vary from 4 to 128 and that a practical figure is 64. This assumes that for practical lengths of lines when using a bi-phase signal two to four biphase periods should be taken into account and the number of sampling points per bi-phase period at which correction is required may be from one to eight.

It will be apparent that any increase in the number of periods to be taken into account or in the number of points within a period to be taken into account will cause a corresponding increase in the required capacity of the memory unit.

SUMMARY OF THE INVENTION

It is an object of the invention to reduce the required capacity of the memory unit while maintaining the number of periods of the bi-phase signal and the number of sampling points at which the correction is to be made.

The invention provides a system as described in the opening paragraph characterized in that the same storage location is used for storing the echo replica for two sets of transmitted data which are complementary to each other and that the output of the memory unit is complemented before being fed to the subtractor for one of the two sets of transmitted data.

The invention is based on the recognition of the fact that if the echoes caused by the transmission of a logical '1' are equal and opposite to those caused by the transmission of the logical '0', then echoes caused by two sets of data which are complementary to each other will also be equal and opposite. Consequently, echo replicas for only one of the sets of data need be stored. Two advantages result from this measure: first the required capacity of the memory unit is halved and secondly the convergence time of the echo canceller is also halved since only half the number of echo replicas have to be constructed.

BRIEF DESCRIPTION OF THE DRAWINGS

An embodiment of the invention will now be described, by way of example, with reference to the accompanying drawings, in which.

DESCRIPTION OF THE PREFERRED EMBODIMENT

Figure 1:
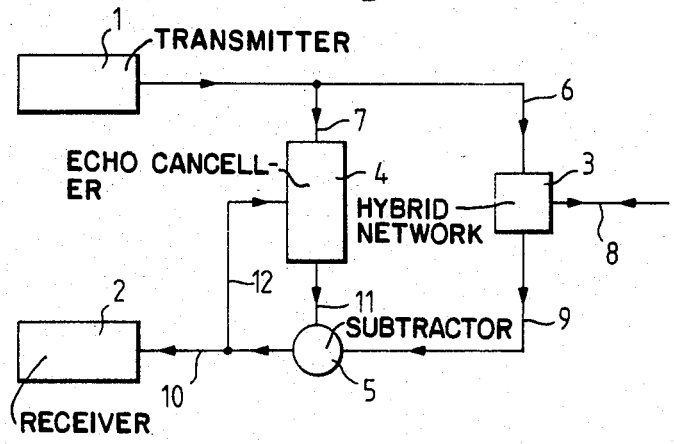
FIG. 1 shows in block schematic form a transmitter/receiver for use in a communication system according to the invention.

FIG. 1 shows a transmitter/receiver for use in a communication system which comprises a transmitter 1, a receiver 2, a hybrid network 3, an echo canceller 4, and a subtractor 5. The signal to be transmitted is fed from the transmitter 1 via a path 6 to the hybrid network 3 and via a path 7 to a first input of the echo canceller 4. The hybrid network 3 causes the signal to be transmitted to be coupled to a transmission path 8 while minimizing the magnitude of the transmitted signal fed to the receiver 2. Hybrid networks however do not provide sufficient isolation between the transmitter 1 and receiver 2 to enable reliable duplex data transmission to be achieved. In order to reduce still further the proportion of the signal to be transmitted which is fed back to the input of the receiver 2 the echo canceller 4 is connected across the analog hybrid network 3 to increase the isolation between the transmitter and the receiver to an acceptable level. It does this by testing for correlation between the transmitted and the received signals and producing an output, the echo replica, which when subtracted from the received signal minimizes this correlation. The signal to be transmitted is fed to the echo canceller 4 via a line 7 while the received signal is fed to a first input of the subtractor 5 via a line 9. The output from the echo canceller 4 is fed to a second input of the subtractor 5 via a line 11. The subtractor 5 subtracts the signal produced by the echo canceller 5 from the received signal and its output is fed to the receiver 2 via a line 10 and to the echo canceller 4 via a line 12.

The echo itself can be divided into two parts: near-end echo and distant or line echo. The near-end echo is due to the direct leakage of the transmitted signal into the receiver because of the poorly balanced hybrid network, and the line-echo is due to impedance discontinuities in the two-wire circuit. The distant echo is normally much smaller in magnitude than the former and its main significance is its delayed arrival. The level of the near-end echo can be as great as $-10$ dB, relative to the transmitted signal level, so that on long connections when the level of the received far-end signal can be $-40$ dB relative to the transmitted signal level, the interfering echo signal can be 30 dB stronger than the wanted signal. If it is assumed that a 30% closure of the eye is tolerable for a 2-level digital system, the wanted signal must be 10 dB stronger than the interfering signals. On this basis, and with some allowance for the line echo, an echo-canceller capable of providing between 40 to 50 dB echo suppression is desirable.

The maximum echo length with which the canceller will be required to cope is determined by the line echoes. Hence the maximum possible echo length is the round trip time for the signal for the largest line connection. However, not all line echoes need to be cancelled. For instance, the reflections from the far-end equipment on long connections do not need to be considered since these will have been attenuated by more than twice as much as the wanted signal and are therefore unlikely to cause any problem. A simple criterion which may be used to determine the "significant echo length" is that the line echoes arriving at the receiver which are more than 10 dB below the wanted signal level may be ignored. To proceed further with this argument the length of the longest connection needs to be known.

If it is assumed that the system is designed to allow subscribers within 5 km of their local exchange to be reached at 96 kbit/s using the WAL 2 code and that at a frequency of 96 kHz the line attenuation is approximately 8 dB/km then only echoes from the first 2.8 km need be considered as significant even with a reflection coefficient as high as 0.5. At lower frequencies the line attenuation is lower and the significant echo length longer. However, with a code such as WAL 2 the energy at low frequencies is very small. An echo length of about 30 $\mu$s corresponding to a 3 km line length is therefore considered to be sufficient for the system as described.

The convergence time is the time it takes the echo-canceller to produce a sufficiently accurate echo replica. It depends on various factors which include adaptive alogrithm used, degree of echo suppression required, maximum length of echoes expected, correlation between the digital signals transmitted from the two ends and the rate of transmission. In general, a convergence time of less than a second is normally acceptable. Even after the convergence time the echo-canceller should continue to adapt so as to respond to slow changes in the line characteristics due to, for example, temperature variations.

Figure 3:
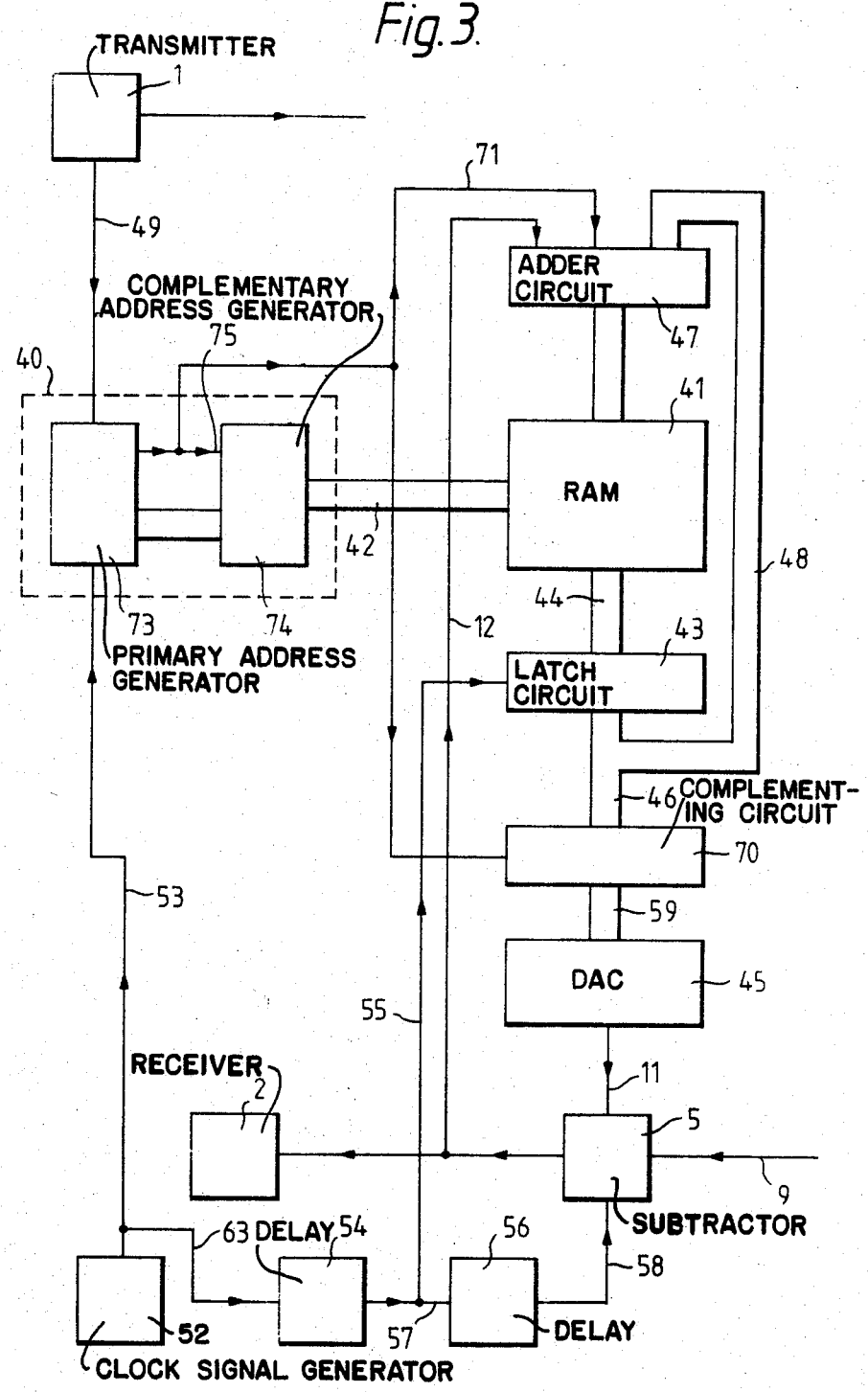
FIG. 3 shows an embodiment of an echo canceller suitable for use in the transmitter/receiver shown in FIG. 1 and its connection to the transmitter and receiver.

As shown in FIG. 3 the data to be transmitted by the transmitter 1 is fed also to an address generator 40 which applies address codes to the address inputs of a Random Access Memory (RAM) 41 via a highway 42. The data outputs of the RAM 41 are connected to inputs of a latch circuit 43 via a highway 44, the outputs of the latch circuit 43 being applied to a first set of inputs of an adder circuit 47 via a highway 48 and to the inputs of a complementing circuit 70 via a highway 46. The output of the DAC 45 is fed via the line 11 to the second input of the subtractor 5 while the received signal is fed via the line 9 to the first input of the subtractor 5. The output of the subtractor 5 is fed via the line 10 to the receiver 2 and via the line 12 to a second set of inputs of the adder circuit 47. The output of a clock signal generator 52 is connected to the address generator 40 via a line 53 and to a delay circuit 54 via a line 63. The output of the delay circuit is connected to a clock input of the latch circuit 43 via a line 55 and to the input of a further delay circuit 56 via a line 57. The output of the delay circuit 56 is connected to a further input of the subtractor 5 via a line 58. The address generator 40 produces a further output which is fed to a further input of the adder 47 via a line 71 and to a control input of the complementing circuit 70 via a line 72.

The principle of operation of the look-up-table type adaptive echo-canceller shown in FIG. 3 is basically to store digital replicas of all possible echoes and to use these when required to nullify the echoes. As the received echoes are correlated to the transmitted data, the transmitted data can be used to form an address which points to the appropriate memory location where an echo-replica for that particular bit sequence transmitted is stored. The content of the RAM 41 is converted by the digital to analog converter (DAC) 45 to an analogue voltage before being subtracted in the subtractor 5 from the received signal. The adder circuit 47 gives the system a self-adjusting capability using the output of the subtractor as a control signal to update the memory content so as to minimize the difference between the replica and the actual echo.

As shown in FIG. 3 the input signal to the address generator 40 is the original input data sequence of the transmitter 1. This considerably simplifies the address logic which would otherwise have to undo at least some of the processing done by the transmitter. However, since the transmitter now forms part of the echo path, good performance can only be expected if the transmitter is linear. If it includes some non-linear operations, such as scrambling, then to obtain the best performance, it must be divided into a non-linear and a linear portion, and the input to the address generator 40 taken from the output of the non-linear portion.

The maximum echo length with which the canceller can cope is determined by the width of the address. It has been found that for a bit rate of 96 kbit/s an echo length of 30 $\mu$s is normally sufficient to account for line delay. The increase caused by the transmitter, the hybrid and any filters that may be necessary between the hybrid coupler and the subtractor is uncertain since it depends on the design of these networks. For every 10.4 $\mu$s increase in echo length the address width must be increased by one bit (thus doubling the memory size). If the maximum echo length is not taken into consideration not only will these echoes not be fully cancelled but also the accuracy of the echo replicas will be effected. For the currently considered case, if an increase of about 10 $\mu$s is assumed the address width will be 4 bits. This latter figure must be increased by $\text{Log}_2 R$, if the received signal is sampled R times in each data bit interval. For WAL 2 code, for example, the Nyquist sampling rate is four times the bit frequency so that the total address width in this case will be 6 bits.

A number of algorithms for minimizing the mean square error are available, examples of which have been discussed in a paper by N. A. M. Verhoeckx, H. C. van den Elzen, F. A. M. Snijders, and P. J. van Gerwen published in IEEE transactions on Acoustics, Speech, and Signal Processing, Volume ASSP-27, No. 6, December 1979 at pages 768 to 781 and entitled "Digital Echo Cancellation for Baseband Data Transmission", the contents of which are incorporated herein by reference. In choosing the right algorithm a compromise has to be made between convergence time and the attainable minimum mean square error on one hand and hardware complexity on the other. In the adaptive echo-canceller shown the simplest algorithm, known as the sign algorithm, has been chosen. Thus only the sign of the subtractor output is used in the adaptive process; one bit being added to or subtracted from the relevant memory location depending on whether the sign is positive or negative.

At the start of adaption this may mean a slow convergence process. However, once convergence has been achieved the echo-replica will not wander by more than a few DAC steps from the echo value. In the absence of far-end transmission convergence will be to $\pm 1$ step of echo level. In the presence of far-end transmission, convergence occurs as before to the point when the residual echo at the output of the subtractor becomes just smaller than the wanted signal. The sign of the control signal is then determined by the wanted signal so that no further information on the echo component can be extracted. In this case, therefore, the system converges to give a wanted signal to residual echo ratio of 0 dB. The solution to this problem is not to have a fixed threshold comparator to determine the sign of the control signal but to shift the threshold randomly between the peak-to-peak wanted signal level. This "dither effect" enables the echo to be suppressed to a level well below the wanted signal.

The word length of the digital to analog converter depends on two main factors: the acceptable residual-echo level in relation to the wanted signal and the maximum echo suppression required. If an echo-suppression ratio of Y is required and a residual-echo level of $mV_s$ (peak) is acceptable, $V_s$ being the DAC step sizes, than the word length W is given by:

$$Y = (2^W / 2m)$$

or $$W = \log_2 2mY$$

The residual-echo distribution for the sign algorithm is binominal and given by:

$$P_m = {}_{2a}C_{a+m}(1/2a) \quad (m=0, \pm 1, \pm 2, \ldots \pm a)$$

where $a = (V_T / V_s)$
$V_T$ being the peak value of the signal used for threshold dithering. If residual-echo levels above $n\sigma V_s$ ($\sigma$ being the standard deviation of the residual-echo distribution and n a positive integer) can be ignored on the grounds that the probability of their occurring is small (e.g. $p(|m| > 4\sigma) \simeq 1 \times 10^{-6}$), then $$W = \log_2 2n\sigma Y$$

Thus, if the smallest wanted signal S(k) is 30 $V_s$ then for residual-echo within four standard deviations an echo suppression of about 42 dB for 12 bit DAC, or 54 dB for 14 bit DAC can be achieved assuming that using AGC $$V_T = S(k) + \sigma V_s$$

The memory word length is, of course, the same as the DAC word length. Hence if a 12 bit DAC is considered sufficient then the required RAM size is 64 words of 12 bits.

For 96 kbit/s WAL 2 coded data a clock frequency of 384 kHz is needed. This may be the same as the transmitter clock. A major factor in the timing of the various circuits is the propagation delay around the closed feedback loop. If the circuits in the loop are fast enough to give a propagation delay of less than one clock period (2.6 μs), then the reading and updating of a given memory location can be performed in the same clock period while the same address is being held. Using a fast bipolar RAM, a DAC with a conversion time of about 1 μs, fast settling operational amplifiers and low-power Schottky TTL logic circuits a loop delay of less than 2 μs is possible. Thus a given memory location can be read and updated within one clock period. This makes the timing of the various circuits far easier than would otherwise be the case.

If a higher bit rate is used then it may not be possible to read and update a given memory location within one clock period. In this case, a bidirectional parallel-in parallel-out shift register can be used so that after reading data from one memory location the preceding location can be addressed and updated. As the clock period decreases the address width may also have to be increased.

Figure 2:
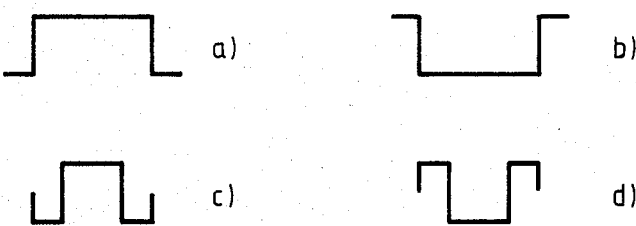
FIG. 2 illustrates the WAL 2 codes corresponding to a binary one and binary zero.

FIG. 2 illustrates the form of the WAL 2 transmission code FIG. 2c showing the WAL 2 equivalent of a logical '1' (FIG. 2a) and FIG. 2d showing the WAL 2 equivalent of a logical '0' (FIG. 2b).

The memory size may be reduced or the echo length capability increased by making use of the fact that if the echoes caused by the transmission of a logical '1' are equal and opposite to those caused by the transmission of a logical '0', then echoes caused by two sets of data which are complementary to each other will also be equal and opposite. Consequently echo replicas for only one of the two sets of data need be stored.

To enable this reduction in the required storage capacity the address generator 40 is split into a primary address generator 73 and a complementary address generator 74. The primary address generator 73 generates addresses from the data transmitted from the transmitter, the most recent data bit being used to control the complementary address generator 74 via a line 75. The arrangement is such that if a logical '0' is the last bit to be transmitted the address produced by the primary address generator 73 is transferred unchanged by the complementary address generator 74 to the highway 42 while if a logical '1' is the last bit to be transmitted the address produced by the primary address generator 73 is complemented by the complementary address generator 74 before being applied to the highway 42. Simultaneously the state of the last bit transmitted controls, via the line 71 and in conjunction with the output of the subtractor 5, whether the adder 47 adds or subtracts the output of the subtractor 5 from the data on highway 48 and determines via the line 72 whether the output of the RAM 41 is complemented before being applied to the DAC 45. The complementing circuit 70 comprises a plurality of exclusive OR gates, one for each bit of the output of the RAM 41, one input of each of the exclusive OR gates being connected to the line 72, the other input being connected to the respective RAM output, and the output being connected to respective lines of the highway 59.

By this means the required memory size may be halved. In addition, since there are only half as many echo replicas to be constructed, the convergence time of the echo canceller will also be halved. The application of this principle means that the ability of the echo canceller to deal directly with any d.c. offset in the system or with any non linearity in the echo path has to be sacrificed. However since the more complex transversal filter type echo canceller, which inherently assumes a linear echo path and zero d.c. offset, has been successfully applied it is evident that these properties although desirable are not essential.

Figure 4:
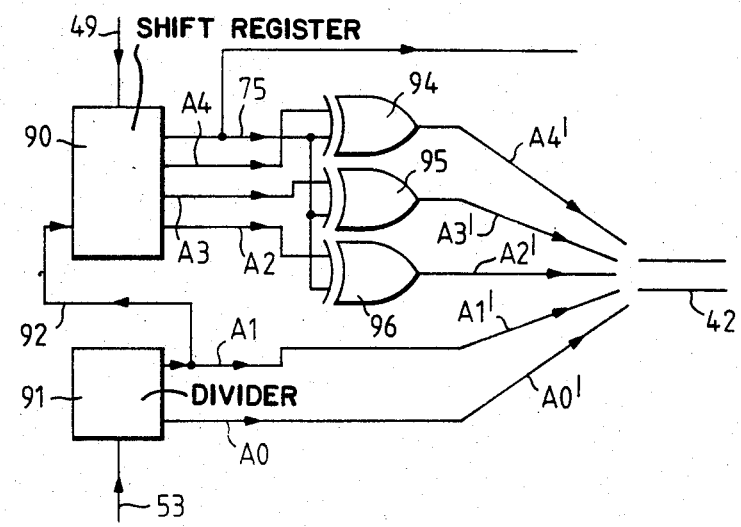
FIG. 4 shows an embodiment of an address generator for use in the echo canceller shown in FIG. 3.

FIG. 4 shows in greater detail the address generator 40 shown in FIG. 3. The primary address generator 73 comprises a four bit serial in-parallel out shift register 90 and a binary divider 91. The divider 91 divides the clock signal on line 53 by four so that the signal on line 92, which is the clock signal for the shift register 90, occurs at the data rate. The complementary address generator 74 comprises three exclusive OR gates 94 to 96, the signal on line 75 being applied to one input of each gate. The other three outputs of the shift register 90 are applied to the other inputs of gates 94 to 96, while the two outputs of the divider 91 are not complemented but fed directly to the highway 42. Thus, when the last data bit transmitted is a logical '1' the other outputs of the primary address generator 73 are inverted by the exclusive OR gates 94 to 96 which form the complementary address generator 74. However when the last data bit transmitted is logical '0' no inversion of the other outputs of the primary address generator 73 takes place in the exclusive OR gates 94–96.

Since the last two bits of the RAM address are related to the particular sample time within the bit period these two bits are not complemented but are fed direct to the highway 42. Thus at the first sampling time during a given bit period the echo replica will have a certain magnitude but its sign will depend on the data content, while at the second sampling time during a given bit period the echo replica will have a second certain magnitude but again its sign will depend on the data content and so on for each sampling time during the given bit period. Therefore the bits relating to the sampling time are independent of the data content and must not be complemented.

The first three bits of the addresses generated by the address generator are shown in Table 1 correlated with the last four data bits transmitted

TABLE I

| Transmitted Data | Address | Transmitted Data | Address |
| --- | --- | --- | --- |
| 0000 | 000 | 1111 | 000 |
| 0001 | 001 | 1110 | 001 |
| 0010 | 010 | 1101 | 010 |
| 0011 | 011 | 1100 | 011 |
| 0100 | 100 | 1011 | 100 |
| 0101 | 101 | 1010 | 101 |
| 0110 | 110 | 1001 | 110 |
| 0111 | 111 | 1000 | 111 |

Figure 5:
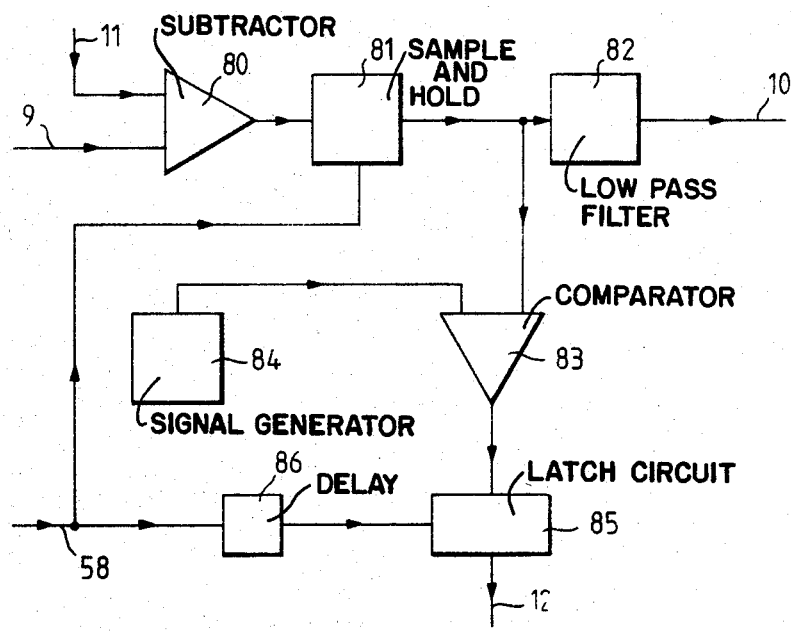
FIG. 5 shows an embodiment of a subtractor for use in the echo canceller of FIG. 3.

The subtractor 5 is shown in greater detail in FIG. 5 and comprises a subtractor 80, a sample and hold circuit 81, a low pass filter 82, a comparator 83, a signal generator 84, a latch circuit 85, and a delay circuit 86. The received signal on line 9 and the echo replica on line 11 are connected to first and second inputs of the subtractor 80 which produces at its output a signal proportional to the difference between the received signal and the echo replica. The output of the subtractor 80 is fed to the sample and hold circuit which under the control of the clock signal on line 58 samples the output of the subtractor 80 and applies the sampled signal to the input of the low pass filter 82 and to a first input of the comparator 83. The output of the low pass filter 82 is fed via line 10 to the receiver 2. The signal generator 84 which produces a signal having a triangular waveform at a frequency of approximately 13 kHz is applied to a second input of the comparator 83. The output of the comparator 83 is connected to a latch circuit 85 into which it is clocked by the clock on line 58 delayed by a time which is determined by the delay circuit 86. The output of the latch 85 is fed via the line 12 to the adder 47.

The echo canceller shown in FIGS. 3, 4 and 5 operates as follows. Data to be transmitted by the transmitter 1 is fed also to the address generator 40 and causes a word in the RAM 41 to be addressed, the word addressed being dependent on the sequence of data bits to be transmitted, in this case the last four bits. These bits are read in serially to the shift register 90 and are read out in parallel on lines A2 to A3 and 75. The fifth and sixth bits of the address are available on lines A0 and A1 from the frequency divider 91. The address applied to the RAM 41 via the highway 42 is derived from the outputs of the complementary address generator 74 on lines A0' to A4' and the RAM 41 is enabled by the clock signal on line 53. The output of the RAM 41 is passed via the highway 42 to the latch circuit 43 where it is captured under the control of the clock signal on line 55. The output of the latch circuit 43 is passed via the highway 46 to the DAC 45 where it is converted to an analog signal for application via the line 11 to the subtractor 5. The sign of the analogue signal is determined by the most significant bit and the signal on line 72 by means of the complementing circuit 70. The output of the latch 43 is also passed via the highway 48 to the first set of inputs of the adder circuit 47. The echo replica, which is the signal on line 11 from the DAC 45 is subtracted in the subtractor 80 from the received signal on line 9. The output of the subtractor 80 is fed to the sample and hold circuit 81 which operates under the control of the clock signal on line 58. The output of the sample and hold circuit 81 is fed via the low pass filter 82 and the line 10 to the receiver 2 and to one input of the comparator 83. The output of the signal generator 84 is connected to the other input of the comparator 83 and the state of the output of the comparator 83 is captured by the latch 85 at a time determined by the clock signal on line 58 delayed by the delay circuit 86. The signal generator 84 provides the dither signal which, as described hereinbefore enables the residual echo level to be reduced below that of the input signal. The output of the latch 85 is fed via the line 12 to the second set of inputs of the adder circuit 47 and causes adder to produce an output which is equal to the number on the first set of inputs increased or decreased by one depending on whether the output of the sample and hold circuit 81 is greater than or less than the output of the signal generator 84 at the instant the output of the comparator 83 is clocked into the latch 85 in combination with the value of the last transmitted data bit as applied over line 71.

The timing of the various operations described is as follows. At the start of a clock cycle the RAM 41 is addressed and the output is latched after a first delay period which allows the addressed data to appear on the highway 44. After a second delay period the output of the subtractor 80 is captured by the sample and hold circuit 81 this delay being sufficient to allow the DAC 45 to convert the digital echo replica from the output of the latch 43 into an analog signal and to allow the subtractor 80 to settle. After a third delay to allow the comparator 86 to compare the outputs of the sample and hold circuit 81 and the signal generator 84 the output of the comparator 83 is captured by the latch 85. The adder circuit 47 then produces an output which is equal to the data on its first set of inputs incremented or decremented by one which is then read into the RAM 41. This last operation is preferably completed during the address period i.e. within a period of the output of the clock generator 52 in order to simplify the addressing of the RAM 41.

I claim:

1. A digital duplex communication system comprising a transmitter/receiver including an echo canceller, the echo canceller comprising a memory unit having a plurality of locations for storing echo replicas, an address generator for causing echo replicas to be read out from selected locations of the memory unit depending on the transmitted data, a subtractor for subtracting the echo replica from the received signal and adaption means for updating the stored echo replica characterized in that the same storage location is used for storing the echo replica for two sets of transmitted data which are complementary to each other and that the output of the memory unit is complemented before being fed to the subtractor for one of the two sets of transmitted data.

2. A system as claimed in claim 1, in which the value of the last transmitted bit determines whether the output of the memory unit is complemented.

3. A system as claimed in claims 1 or 2, in which the address generator comprises a primary address generator for producing n-address bits, where n is a positive integer equal to the number of data bits transmitted during the period over which the correction for each bit is effective and a complementary address generator, the complementary address generator comprising n−1 exclusive OR gates wherein one address bit from the primary address generator is connected to a first input of each exclusive OR gate and the other bits from the primary address generator are connected to the second inputs of respective exclusive OR gates, the outputs of the exclusive OR gates being the outputs of the address generator.

4. A system as claimed in claim 3, in which the last transmitted bit is fed to the first inputs of the exclusive OR gates.

5. A system as claimed in claims 1 or 2 in which a digital to analogue converter is included between the memory unit outputs and the subtractor input.

6. A system as claimed in claims 1 or 2 in which the output of the subtractor is fed to the first input of a comparator, the output of a triangular waveform generator being fed to a further input of the comparator, and the output of the comparator being connected to an input of the adaption means.

* * * * *